(12) United States Patent
Major et al.

(10) Patent No.: US 12,244,896 B2
(45) Date of Patent: *Mar. 4, 2025

(54) AUTOMATED CONTENT IDENTIFICATION FOR BINGE WATCHING OF DIGITAL MEDIA USING AUTO-SKIP PROCESSING

(71) Applicant: DISH Network L.L.C., Englewood, CO (US)

(72) Inventors: Robert Drew Major, Orem, UT (US); Steven Casagrande, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,318

(22) Filed: Sep. 28, 2023

(65) Prior Publication Data

US 2024/0048804 A1 Feb. 8, 2024

Related U.S. Application Data

(63) Continuation of application No. 16/732,042, filed on Dec. 31, 2019, now Pat. No. 11,825,160.

(Continued)

(51) Int. Cl.
*H04N 21/454* (2011.01)
*H04N 21/2343* (2011.01)
(Continued)

(52) U.S. Cl.
CPC . *H04N 21/4542* (2013.01); *H04N 21/234345* (2013.01); *H04N 21/44008* (2013.01); *H04N 21/44204* (2013.01); *H04N 21/454* (2013.01)

(58) Field of Classification Search
CPC ....... H04N 21/4542; H04N 21/234345; H04N 21/44008; H04N 21/44204; H04N 21/454; G06V 20/49
(Continued)

(56) References Cited

U.S. PATENT DOCUMENTS 7,251,413 B2 7/2007 Dow et al.
7,809,154 B2 10/2010 Lienhart et al.
(Continued)

FOREIGN PATENT DOCUMENTS

WO 2016133504 A1 8/2016
WO 2016209400 A1 12/2016

OTHER PUBLICATIONS

International Search Report and Written Opinion for PCT/US2019/045383 dated Nov. 7, 2019, all pages.
(Continued)

*Primary Examiner* — Thai Q Tran
*Assistant Examiner* — Nienru Yang
(74) *Attorney, Agent, or Firm* — KW Law, LLP

(57) ABSTRACT

"Binge watching" of multiple episodes of a program is improved by the player device automatically skipping repeated portions of the program. Opening and closing credit scenes, for example, can be automatically skipped to thereby allow the viewer to progress through the entire season of programming at an even faster rate than was previously thought possible. Programming to be skipped may be identified by detecting audio or other digital fingerprints in the content itself, for example. Content to be skipped may be identified to the playback device according to anchor points or other references in the programming itself.

18 Claims, 3 Drawing Sheets

Related U.S. Application Data

(60) Provisional application No. 62/787,211, filed on Dec. 31, 2018.

(51) Int. Cl.
*H04N 21/44* (2011.01)
*H04N 21/442* (2011.01)

(58) Field of Classification Search
USPC ..................................................... 386/278
See application file for complete search history.

(56) References Cited

U.S. PATENT DOCUMENTS

| | | |
|---|---|---|
| 9,418,296 B1 | 8/2016 | Kansara |
| 9,465,996 B1 | 10/2016 | Greene |
| 9,558,784 B1 | 1/2017 | Gray et al. |
| 9,843,759 B2 | 12/2017 | Jojic et al. |
| 10,049,158 B1 | 8/2018 | Goetz |
| 10,123,062 B1* | 11/2018 | Matthews ............... G06V 20/48 |
| 10,694,244 B2 | 6/2020 | Kim et al. |
| 10,739,944 B1 | 8/2020 | Pasalapudi et al. |
| 2005/0021811 A1 | 1/2005 | Roelens |
| 2005/0132401 A1 | 6/2005 | Boccon-Gibod et al. |
| 2006/0215991 A1 | 9/2006 | Larson et al. |
| 2006/0248439 A1* | 11/2006 | Takahashi ............... G11B 20/10 715/201 |
| 2006/0271947 A1 | 11/2006 | Lienhart et al. |
| 2008/0240674 A1 | 10/2008 | Moore |
| 2008/0301168 A1 | 12/2008 | Adler et al. |
| 2009/0133093 A1 | 5/2009 | Hodge |
| 2010/0190555 A1 | 7/2010 | Dutilly et al. |
| 2011/0041060 A1 | 2/2011 | Chien et al. |
| 2012/0023254 A1 | 1/2012 | Park et al. |
| 2012/0089914 A1 | 4/2012 | Holt et al. |
| 2012/0233631 A1 | 9/2012 | Geshwind |
| 2013/0110980 A1 | 5/2013 | Benn et al. |
| 2013/0132382 A1 | 5/2013 | Kuznetsov et al. |
| 2014/0071344 A1 | 3/2014 | Francisco |
| 2014/0255004 A1 | 9/2014 | Allen et al. |
| 2014/0365675 A1 | 12/2014 | Bhardwaj et al. |
| 2015/0312647 A1 | 10/2015 | Abramson et al. |
| 2015/0350735 A1 | 12/2015 | Koser |
| 2016/0124596 A1 | 5/2016 | Doerring |
| 2016/0173941 A1 | 6/2016 | Gilson et al. |
| 2016/0269455 A1 | 9/2016 | Casey et al. |
| 2016/0342844 A1 | 11/2016 | Kansara |
| 2017/0034578 A1* | 2/2017 | Patel ..................... H04N 21/482 |
| 2017/0164053 A1 | 6/2017 | Jaffe et al. |
| 2017/0287346 A1* | 10/2017 | Yadav .................... G09B 5/065 |
| 2017/0353519 A1 | 12/2017 | Mcleod et al. |
| 2018/0152743 A1 | 5/2018 | Wood |
| 2018/0205975 A1* | 7/2018 | Oh ..................... H04N 21/4884 |
| 2019/0028525 A1 | 1/2019 | Kansara |
| 2019/0373322 A1 | 12/2019 | Rojas-Echenique et al. |
| 2020/0005048 A1 | 1/2020 | Bharde et al. |
| 2020/0068253 A1 | 2/2020 | Kim et al. |
| 2020/0194035 A1 | 6/2020 | Catalano et al. |

OTHER PUBLICATIONS

Kiani Vahid; Pourreza Hamid Reza: "Flexible soccer video summarization in compressed domain", ICCKE 2013, IEEE, Oct. 31, 2013 (Oct. 31, 2013), pp. 213-218, XP032531170, DOI: 10.1109/ICCKE.2013.6682798.

Leychenko, Eugene, Feature Teardown: Netflix's "Skip Intro", Mar. 20, 2018, 6 pages. Retrieved from: https://medium.com/swlh/feature-teardown-netflixs-skip-intro-15cac114a136.

Netflix, "How can I prevent Netflix from auto-playing episodes?", Mar. 20, 2018, 2 pages. Retrieved from: https://help.netflix.com/en/node/2102.

Reddit, "Netflix needs a way to skip TV show openings," Mar. 20, 2018, 4 pages. Retrieved from: https://www.reddit.com/r/netflix/comments/5pe8kh/netflix_needs_a_way_to_skip_tov_show_openings_all/.

\* cited by examiner

AUTOMATED CONTENT IDENTIFICATION FOR BINGE WATCHING OF DIGITAL MEDIA USING AUTO-SKIP PROCESSING

PRIORITY CLAIM

This application is a continuation of U.S. patent application Ser. No. 16/732,042 filed on Dec. 31, 2019 and claims priority to U.S. Provisional Patent Application Ser. No. 62/787,211 filed on Dec. 31, 2018, both of which are incorporated herein by reference.

TECHNICAL FIELD

The present disclosure generally relates to computer systems and automated processes for automatically recognizing repeated portions of stored digital media content. More particularly, the following discussion relates to systems and processes to automatically detect portions of television programs or the like that can be automatically skipped without substantially affecting the user experience.

BACKGROUND

As television receivers, media players and other media playback devices become increasingly sophisticated, additional functions and features have become available. Modern television receivers and other media players, for example, are now capable of time or place shifting the viewing experience, of augmenting the viewing experience with enhanced data or other content, and/or of taking any number of other useful actions to enhance the viewer's enjoyment of their media programming.

In recent years, many viewers have taken to "binge watching" certain programs, particularly when multiple episodes of the same program are simultaneously available via a remote or local digital video recorder (DVR), a video on demand (VOD) service, and/or the like. "Binge watching" typically refers to watching multiple episodes of a television back-to-back rather than waiting for subsequent episodes of a program to become available at a later time. Due to the widespread availability of DVRs and streaming VOD content, it is often possible for a viewer to enjoy an entire season of a program in a matter of hours, as opposed to waiting for days, weeks or even months for subsequent programs to be broadcast or otherwise become available.

Immediate content availability has been very favorably received, and many viewers frequently continue directly to the next episode of a program as soon as they finish viewing the previous episode. It is nevertheless desirable to create systems, devices and automated processes to improve the user experience even further. These and other desirable features and characteristics will become apparent from the subsequent detailed description and the appended claims, taken in conjunction with the accompanying drawings and this background section.

BRIEF DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, television receivers, media players and/or other computerized devices streamline the "binge watching" of programs by automatically skipping over repetitive portions of the program, such as opening or closing credits, preview sequences and/or the like. Program portions to be skipped are supplied to the playback device in any manner so that the device is able to skip over repetitive or otherwise unnecessary portions of the program without manual input from the viewer. Programming to be skipped may be identified by detecting audio or other digital fingerprints in the content itself, in some implementations. Skipped content may be identified according to presentation time stamp (PTS) or other time markers in some types of programming (e.g., video on demand). In other embodiments, automated program detection can be used to set anchor points or other references in the programming itself that can be used to skip over less relevant portions of the programming, as desired.

In other embodiments, an automated process executable by a television receiver, media player or other device suitably comprises the broad steps of: initially rendering, by the media player device, a first program of a program series for playback to a viewer; receiving, by the media player device, digital skip data relating to a second program of the same program series as the first program, wherein the digital skip data indicates at least one portion of the second program that is a duplicate of a viewed portion of the first program; and, during subsequent rendering of the second program of the program series to the viewer, the media player device automatically skipping the at least one portion of the second program that is a duplicate of the viewed portion of the first program. Such a process may be executed by a processor or controller circuit of the device by executing program instructions stored in a memory or other digital storage of the device.

Other embodiments relate to automated process executed by a media player device. The automated process suitably comprises: initially rendering, by the media player device, a first program of a program series for playback to a viewer; receiving, by the media player device, digital skip data relating to a second program of the same program series as the first program, wherein the digital skip data indicates at least one portion of the second program that is a duplicate of a viewed portion of the first program, and wherein the at least one portion is defined with reference to an anchor point in the content of the second program of the program series; and during subsequent rendering of the second program of the program series to the viewer, the media player device automatically skipping the at least one portion of the second program that is a duplicate of the viewed portion of the first program.

Still other embodiments relate to media player or media server devices and systems having processors, non-transitory data storage (e.g., memory, solid state drive, magnetic or optical hard drive, and/or the like), and interfaces for communicating on a network such as the Internet, a wireless telephone network, and/or the like. The data storage suitably stores instructions that are executable by the processor to perform automated processes substantially as described herein.

These and other embodiments are described in increasing detail below.

DRAWING FIGURES

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, "binge watching" of multiple episodes of a program is improved by the player device automatically skipping repeated portions of the program. Opening and closing credit scenes, for example, can be skipped to thereby allow the viewer to progress through the entire season of programming at an even faster rate than was previously thought possible.

Generally speaking, automated content analysis is used to recognize portions of the program that are repeated in different episodes. Information describing the various portions of the program is stored in a database and/or used to adapt playback of the program as desired. As a viewer progresses through a season of a program, for example, program segments that are identified as repetitive can be conveniently (and automatically!) skipped, as desired, thereby allowing the viewer to enjoy multiple episodes of the same program in reduced time.

Figure 1:
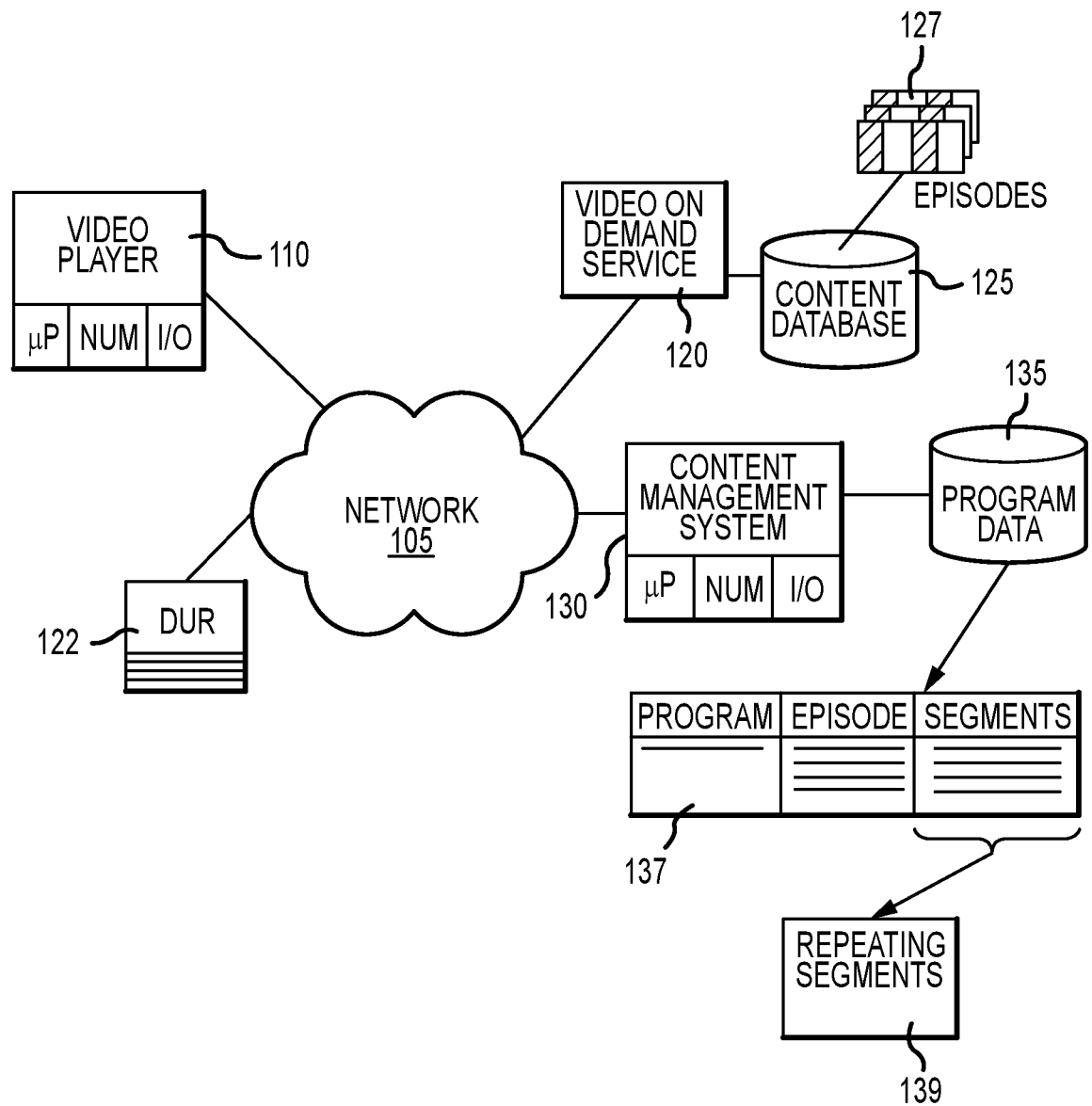
FIG. 1 illustrates an example of a system to recognize and automatically skip over repeating portions of different programs.

With reference to FIG. 1, an example data processing system 100 allows a user of a playback device 110 (e.g., a set top box, a computer, a phone, a tablet, a video game player or any other media device) to select and receive video programs from a program source 120. Source 120 may be a video on demand (VOD) service, as shown in FIG. 1, that includes a database 125 containing multiple episodes 127 of a program. Alternately, source 120 may be a remote service DVR (RSDVR), or a local service DVR implemented in a hard drive or other storage of the playback device 120, as appropriate. Put another way, program content may be received from any broadcast, streaming or other source. In some embodiments, one or more episodes of a program are received from a first source (e.g., a DVR or television receiver 122) and subsequent episodes of the same program are received from a different source (e.g., VOD server 120).

Each episode of the program will typically include multiple program segments corresponding to opening credits, different scenes of the program, commercials, closing credits, etc. Various episodes of the same program will typically include one or more program scenes that repeat from episode to episode, such as opening or closing credits, theme song sequences, and/or the like. As noted above, a "binge watching" viewer may not need to view the repeating scenes (e.g., opening theme, credits) more than once. Indeed, if the viewer is watching many episodes of the same program in a single viewing session, repeated viewings of the same scene may be annoying to the viewer. Often, the viewer will attempt to manually skip over the repeated scenes using fast forward or similar trick play functions, if possible. But manual skipping is imprecise at best, and can be annoying as well.

The various scenes of each episode of each program may be automatically identified for skipping in any manner. One system for automatically identifying and tracking different scenes of broadcast television programs is described in US Patent Publication No. 2017/0208369, which is incorporated herein by reference, although other embodiments could be implemented using any other identification systems or processes, as desired. In some embodiments, an audio or other "fingerprint" of the media program is analyzed to determine if the scene has been previously encountered. Video segments of the various scenes are identified with a hash digest or other unique digital code based upon the content of the scene. If the digital codes produced for a particular segment produce identical (or at least very similar) digital codes as a previously-encountered segment, then the two segments can be determined to be very similar, if not identical. Data that identifies each program segment is typically stored in a database 135 that is managed by a content management system 130 or the like.

This data 137 in the database 135 may be formatted and organized in any manner. Data 137 may be used to augment program content, to replace advertisements, to monitor viewing of advertisements, and/or for any other purpose. In the example illustrated in FIG. 1, data 137 includes identification of program scenes within each episode of a program series. Each scene represents a segment of the program that may be further identified, if desired, with labels or other supplemental information. Segments containing advertisements, for example, may include additional information to identify the advertiser, the product presented, the time and date that the ad was run, the channel or network, etc. Segments representing scenes of the program may be further tagged, as desired. Scene descriptions could identify actors and actresses present in the scene, for example, or any information about the scene (e.g., description of the underlying scene, flags for adult content, etc.).

Data 137 can identify the various segments of the program in any manner. In various embodiments, data 137 identifies the various segments by presentation time stamp (PTS), clock time since the start of the program and/or any other references to the start and end times of the sequence. In some implementations, segments in data 137 are identified by the start and end times of the segment. Equivalently, segments could be defined by a single time reference (e.g., a segment start or stop time) along with a duration of the segment. Identifying program segments according to time references embedded in the program stream itself can be useful in video on demand (VOD) or similar applications in which the program content is available for analysis prior to distribution to the viewer. A typical VOD stream has embedded time references that are relatively unchanging from viewer to viewer. That is, every viewer receiving the same video stream will typically experience the same PTS and/or clock times, so these times can be used to reference scenes within the program. If a recurring scene spans 0:18 seconds through 1:32 seconds of the program, for example, these times will be the same for most, if not all, viewers of the program. Telling the playback device to automatically jump from 0:18 through 1:32 seconds of the playback time, then, can be expected to produce a consistent and accurate skip for multiple viewers.

Playback times can vary, however, for viewers of broadcast programming, particularly if the viewer has recorded the program to a DVR. The start times of programs can vary based upon local broadcasters, advertisement breaks, differences in DVR settings, and any number of additional factors. To auto-skip portions of broadcast content, then, it can be helpful to reference the start and end points of the skipped section to "anchor points" in the dialog, timed text or other content of the program itself.

To that end, automated content recognition can be used to identify repeating segment breaks that can be tied to anchor points in the program content itself. That is, the segment boundaries may not be defined with strict time values, but rather by offset reference to an audio or visual cue in the content itself. Example techniques for referencing segment boundaries of a video program based upon offsets from closed caption data is described in US Patent Publication No. US2017/0188075, although other embodiments may use other techniques or systems, as desired.

Content management system 130 or the like suitably analyzes the database 130 to identify segments of each program that are repeated from episode to episode. As mentioned above, repeated segments of the program may correspond to opening or closing themes, credit sequences and/or the like. These repeated program segments may be marked in database 130, if desired. Such scenes could be marked in data 137 by setting a flag or semaphore, for example, to indicate that the scene is a duplicate of a prior scene or a scene from another episode. Alternately and/or additionally, the content management system 130 may extract at least some of the data 137 for the various repeated scenes to a separate data table 139 in database 135 to indicate repeating segments for particular programs or series.

When a viewer of the media playback device 110 elects to watch a subsequent episode of a just-watched program, then, the device 110 can obtain auto-skip data describing repeated portions of the subsequent episode from a content management service 130, from the program source 120, 122, or from any other source. In various embodiments, data identifying repeated segments is contained in electronic program guide (EPG) data delivered to the playback device 110 from a broadcast or other source. Alternately, the playback device 110 may request the data associated with a selected episode from a CMS 130 or other source via network 105, as desired. The player device 110 then processes the data 137 identifying scenes to be skipped in any manner. In various embodiments, the player dereferences the time and/or anchor point data to recognize and automatically skip over redundant scenes in subsequently-viewed programs.

Figure 2:
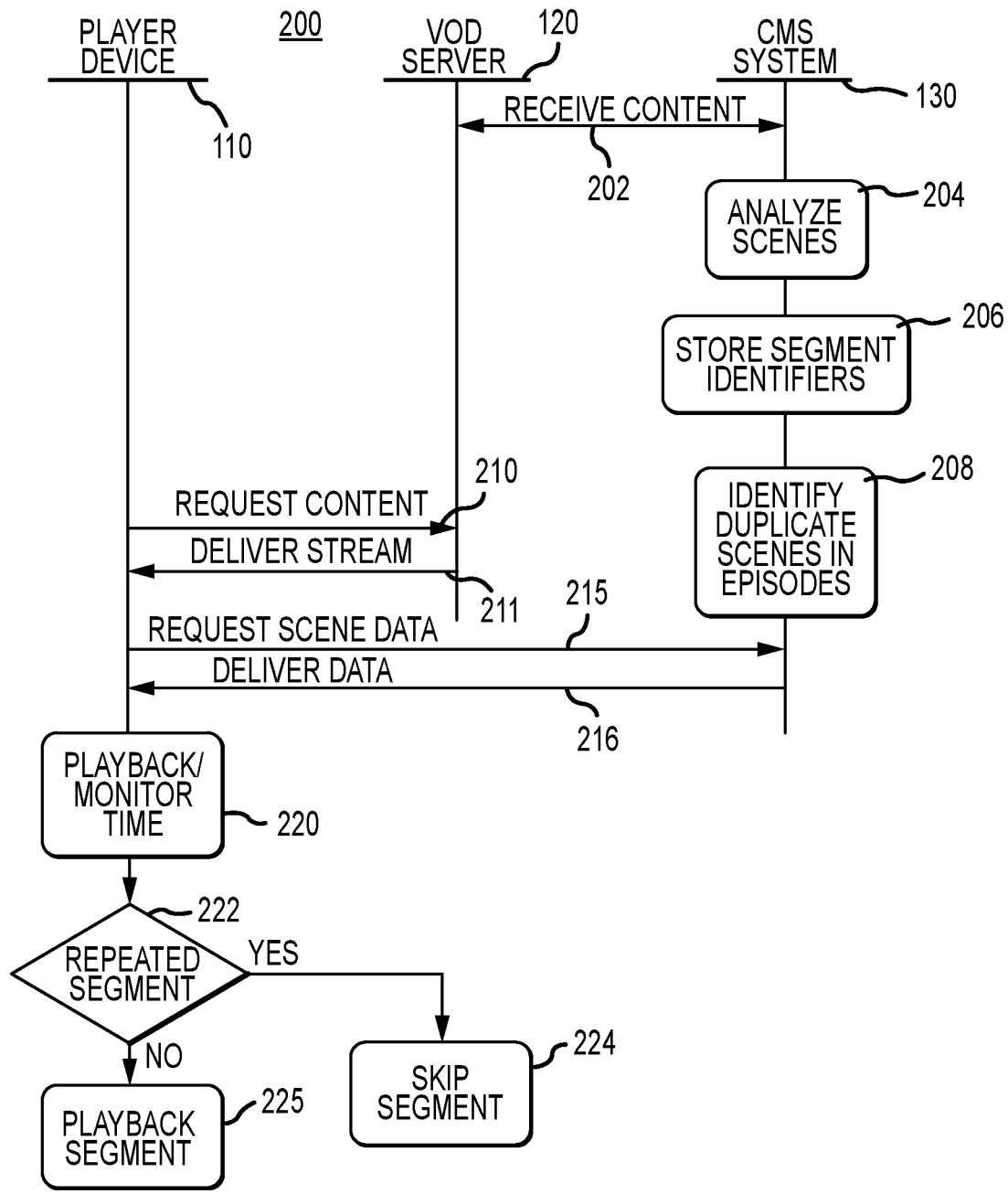
FIG. 2 is a diagram showing various example processes to automatically skip over repeating portions of different programs.
Figure 3:
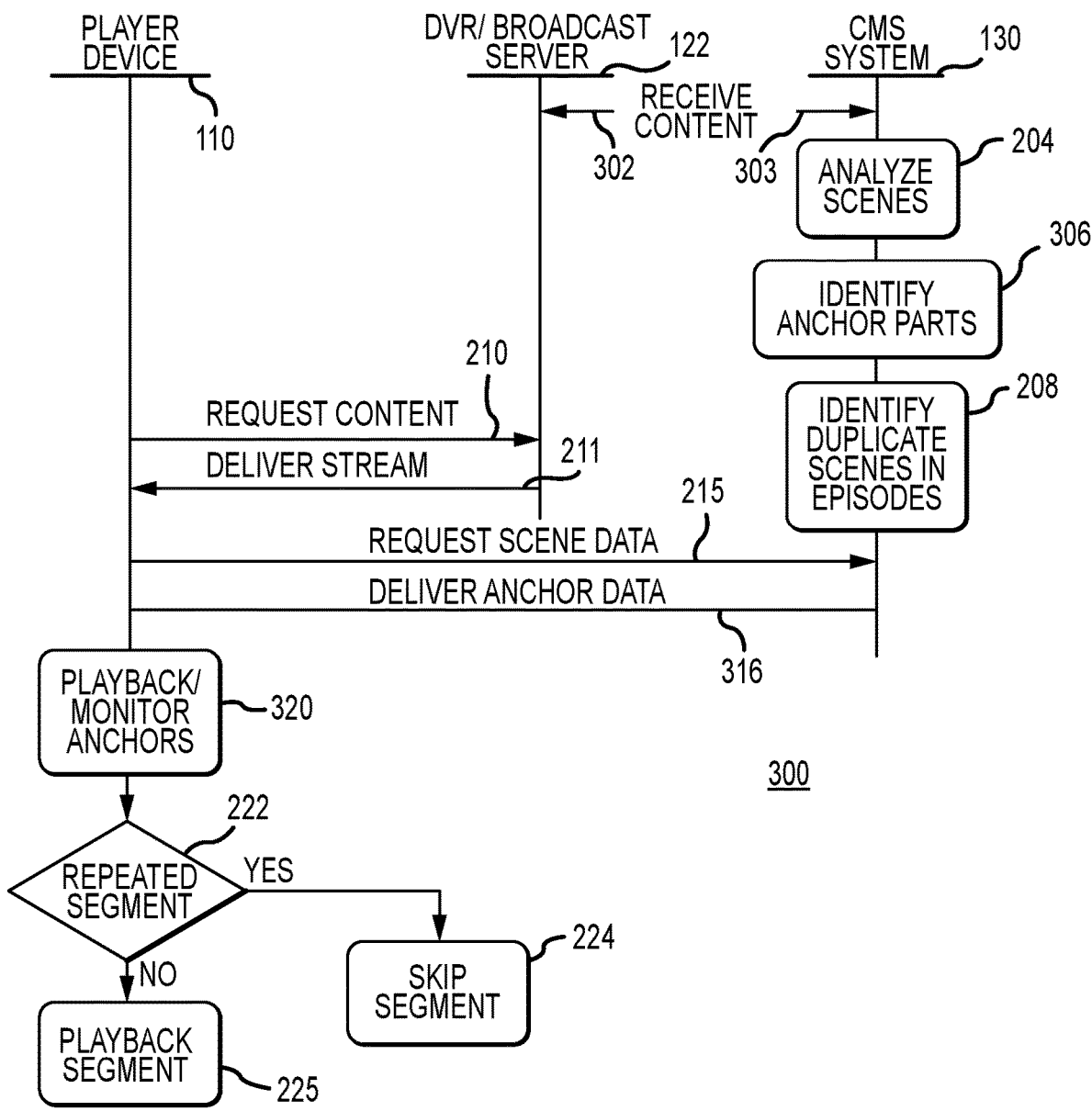
FIG. 3 is a diagram showing various example processes to automatically skip over repeating portions of different portions of different programs using anchor points in the content.

FIGS. 2 and 3 show automated processes 200 and 300 to skip certain segments of a program being viewed based upon segment data received from CMS server 130. FIG. 2 shows a process 200 to automatically recognize and skip duplicate program segments based upon time references in the programming, and FIG. 3 shows a similar process 300 to automatically recognize and skip duplicate program segments based upon anchor points in the program content. In both examples 200 and 300, media player device 110 is appropriately programmed or otherwise configured to automatically skip over those portions 139 of the programs that are repetitive from other episodes of the same program. By skipping those portions of the program that repeat from episode to episode, binge watchers of a program series can avoid unnecessarily viewing content that has already been viewed. The various functions shown in FIGS. 2 and 3 may be carried out by processing hardware (e.g., microprocessors, digital signal processors and/or the like) in the devices shown. Typically, the processing hardware will carry out the various functions by executing programmed instructions that are stored in a memory or other non-transitory digital storage of the device, as appropriate.

With combined reference to FIGS. 2 and 3, the content management system 130 suitably receives the content to be analyzed (function 202, 303), analyzes the various scenes of the program to identify segment boundaries (function 204), and compares the fingerprints or other digital identifiers of the identified scenes to recognize duplicate scenes between programs (function 208).

In various embodiments, CMS system 130 compares digital fingerprint, digest or similar "signature" data used in analysis function 204 to recognize duplicate (or nearly duplicate) scenes in different programs. Function 208 may be carried out at any time after the program content is made available to the analyzing system 130. In various embodiments, the scene analysis and comparison functions are carried out in advance of the program episodes being available to the viewer.

In FIG. 2, CMS 130 receives essentially the same content as the VOD or other service 120 that delivers the content to the player device 110 (function 202). In this example, the segments 137 recognized in function 204 can be identified with respect to PTS, "clock time" or other time references as desired. Since the program source 120 and the analysis system 130 both receive essentially the same program content, the timing can be reasonably assumed to be consistent between the various copies, thereby allowing for relatively accurate and consistent time references while the program is being played back to the viewer. To that end, function 206 typically involves creating entries in database 135 for each identified scene of the program, with temporal references to the boundaries of the segment representing that scene.

In FIG. 3, however, the CMS server 130 may not receive the same content stream as the DVR, television receiver or other source 122 (functions 302 and 303). As noted previously, differences may occur due to different local broadcasters or feeds, different commercial breaks, different settings of a recorded copy versus a broadcast copy, and/or any number of other factors. In this case, absolute time references such as PTS or "clock times" may not be accurate enough for reliable skipping. Instead, CMS references segment boundaries to portions of the timed text stream, the audio stream and/or the like. A word of phrase of timed text, for example, could be identified as an anchor point, with suitable offsets from the anchor point provided so that the player device 110 can determine where the program segment begins and ends. A segment anchor could be, for example, a character saying certain words (e.g., "Hello Jerry!") in the timed text of the program, which is associated with a PTS value. If the segment boundary is known to be some number of seconds prior to and/or after the occurrence of the anchor event, then the boundaries of the program segment can be defined with sufficient precision and accuracy. To that end, function 306 in FIG. 3 involves the CMS system 130 identifying a unique text string or other anchor point that is nearby a segment boundary, and defining the program segment with respect to one or more time offsets from the occurrence of the anchor point. This information may be delivered to the player device for subsequent processing, as desired (function 316).

In both processes 200 and 300, player device 110 suitably requests and receives media programming from an appropriate source 120, 122 (function 210). The source provides the requested content as a media stream or the like (function 211). Note that in some implementations, media source 120, 122 may be physically present within the same device as the playback device 110. A set top box or similar television receiver, for example, may have a DVR, placeshifter and/or receiver component that acts as the program source 122, with a presentation and display component acting as the player device 110, as appropriate. In other embodiments, media source may be a separate device or service apart from player device 110, as when media source 120 is a VOD service 120 that delivers media streams via the Internet or another network 105. Any number of other embodiments may be formulated, as desired.

Segment skip data obtained from analysis 204 may be delivered to one or more media player devices 110 in any manner. In the examples shown in FIGS. 2 and 3, player device 110 requests segment data 137 for the program selected by the viewer (function 215). The segment data 137 may be delivered in any manner. In the example of FIG. 2, segment data 137 is defined with respect to PTS or other time references that can be directly processed by player device 110 (function 216). In FIG. 3, the segment data 137 delivered to the player device 110 is defined with respect to anchor points and offsets, as described above (function 316). In either case, data 137 may be delivered in any other manner, such as via an electronic program guide, via the program source 120, 122 rather than direct from the CMS 130, or in any other manner. It is not necessary that the data 137 be requested by the player device 110 in all embodiments; equivalent embodiments may automatically deliver skip data 137 in conjunction with delivery of the program content and/or with EPG data without the need for a direct request 215, if desired.

The playback device 110 renders the content for playback in any appropriate manner (function 220, 320). In the example of FIG. 2, function 220 involves monitoring playback time and comparing the playback times of any segments contained in the skip data 137. In the example of FIG. 3, function 320 involves monitoring the timed text or other source of anchor points for an occurrence of an anchor, and then processing any offset times to identify relevant program segments. If an identified program segment is to be skipped (function 222), then playback skips from the beginning of the identified segment to the end of the segment (function 224). If the segment is not a duplicate segment or is otherwise not to be skipped, then the segment is rendered for playback, as usual (function 225). Playback and monitoring for skipped segments continues for additional segments and programs, as desired.

Various embodiments may be enhanced or modified in any number of different ways. In some embodiments, the automatic skipping of redundant scenes only occurs if the viewer has actually watched the initial scene within a certain period of time. That is, if the viewer is enjoying multiple episodes of the same program in quick series, the opening theme may be presented in the first episode of the "binge" session, but skipped in subsequent episodes that are watched within the relatively near future (e.g., an hour or so to about a day or so). Similarly, skipping could be suspending if the viewer did not actually watch the initial scene within a predetermined period of time (e.g., an hour of so). To implement this, the playback device would receive an indicia from CMS 130 or another source that identifies the scene to be verified. The playback device 130 would then check if the identified scene was indeed rendered to the viewer within the predetermined time period. If not (e.g., the viewer manually skipped the relevant scene, or began watching after the scene had occurred, or for any other reason the indicia was not received) then the duplicate scene could be presented during playback of the upcoming episode.

In other embodiments, the automated skipping could be activated only for programs that are subsequent episodes of other programs that were watched during the current viewing session, or watched within a threshold period of time (e.g., an hour or so). In this example, repeated scenes can be automatically skipped in episodes watched within the predetermined time period of another episode of the same program, but for viewing outside of the predetermined time period, the repeated scenes are not skipped. For example, if the viewer has watched a prior episode of the same program within the past hour or so, then the repeated scenes can be automatically skipped. Tracking of previously-viewed programs, as opposed to specific scenes, may be easier to implement in practice on many modern playback devices 110. Again, the general concepts set forth herein may be adapted to any number of alternate but equivalent embodiments.

The term "exemplary" is used herein to represent one example, instance or illustration that may have any number of alternates. Any implementation described herein as "exemplary" is not necessarily to be construed as preferred or advantageous over other implementations, nor is it necessarily intended as a model that must be duplicated in other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. An automated process executed by a playback device comprising a processor and a non-transitory data storage having computer-executable instructions stored thereon, the process comprising:
   receiving, by the playback device, digital skip data comprising a list of program portions repeated from a first program of a program series to a second program of the program series, wherein:
      the first program is one episode of the program series and the second program is a different episode of the same program series; and
      each of the repeated program portions is defined according to an offset time and an anchor point in a timed text of the second program that, when combined, indicate a start point of the repeated program portion in the second program, wherein each anchor point is defined by a portion of a dialog occurring at a specified time within the timed text of the second program;
   rendering, by the playback device, the second program for a viewer of the playback device;
   monitoring, during the rendering, the second program for an occurrence of at least one of the anchors in the digital skip data; and
   upon finding at least one of the anchors, automatically skipping the repeated program portion corresponding to the found anchor.

2. The automated process of claim 1, wherein automatically skipping the repeated program portion comprises skipping the repeated program portion upon a determination that the viewer has previously viewed the repeated program portion.

3. The automated process of claim 2, wherein the automatic skipping only occurs if the second program is viewed within a predetermined time of the first program.

4. The automated process of claim 3, wherein the predetermined time is about one hour.

5. The automated process of claim 1, wherein the digital skip data is received by the playback device from a content management service, wherein the content management service previously determined each anchor point in the digital skip data.

6. The automated process of claim 5, wherein the digital skip data is received in response to a request, by the playback device, for the digital skip data associated with the second program.

7. The automated process of claim 1, wherein automatically skipping the repeated program portion comprises not displaying a portion of the second program beginning at the offset from the respective anchor point.

8. A playback device comprising a processor and a non-transitory data storage having computer-executable instructions stored thereon that, when executed by the processor, perform an automated process that comprises:
   receiving, by the playback device, digital skip data comprising a list of program portions repeated from a first program of a program series to a second program of the program series, wherein:
      the first program is one episode of the program series and the second program is a different episode of the same program series; and
      each of the repeated program portions is defined according to an offset time and an anchor point in a timed text of the second program that, when combined, indicate a start point of the repeated program portion in the second program, wherein each anchor point is defined by a portion of a dialog occurring at a specified time within the timed text of the second program;
   rendering, by the playback device, the second program for a viewer of the playback device;
   monitoring, during the rendering, the second program for an occurrence of at least one of the anchors in the digital skip data; and
   upon finding at least one of the anchors, automatically skipping the repeated program portion corresponding to the found anchor.

9. The playback device of claim 8, wherein automatically skipping the repeated program portion comprises skipping the repeated program portion upon a determination that the viewer has previously viewed the repeated program portion.

10. The playback device of claim 9, wherein the automatic skipping only occurs if the second program is viewed within a predetermined time of the first program.

11. The playback device of claim 10, wherein the predetermined time is about one hour.

12. The automated process of claim 8, wherein the digital skip data is received by the playback device from a content management service, wherein the content management service previously determined each anchor point in the digital skip data.

13. The automated process of claim 12, wherein the digital skip data is received in response to a request, by the playback device, for the digital skip data associated with the second program.

14. The automated process of claim 8, wherein automatically skipping the repeated program portion comprises not displaying a portion of the second program beginning at the offset from the respective anchor point.

15. An automated process executed by a content management system comprising a processor and a non-transitory data storage having computer-executable instructions stored thereon, the process comprising:
   identifying, by the content management system, a first plurality of program portion boundaries of a first program of a program series;
   identifying, by the content management system, a second plurality of program portion boundaries of a second program of the program series, wherein the first program is one episode of the program series and the second program is a different episode of the program series;
   determining, by the content management system, one or more program portions that are repeated from the first program to the second program;
   identifying, by the content management system, an offset time and an anchor point in a timed text of the second program that, when combined, indicate a start point for each repeated program portion in the second program, wherein each anchor point is defined by a portion of a dialog occurring at a specified time within the timed text of the second program;
   determining a digital skip data comprising a list of the repeated program portions and the corresponding anchors; and
   delivering, via a network, the digital skip data to a playback device to enable the playback device to automatically skip the repeated program portions.

16. The automated process of claim 15, wherein the identifying and determining steps are executed prior to the second program being available to the playback device.

17. The automated process of claim 15, wherein the digital skip data is delivered in response to a request, by the playback device, for the digital skip data for the second program.

18. The automated process of claim 15, further comprising tracking, by the content management system, whether a repeated program portion was previously viewed by a viewer of the playback device.

\* \* \* \* \*